Figure 1:
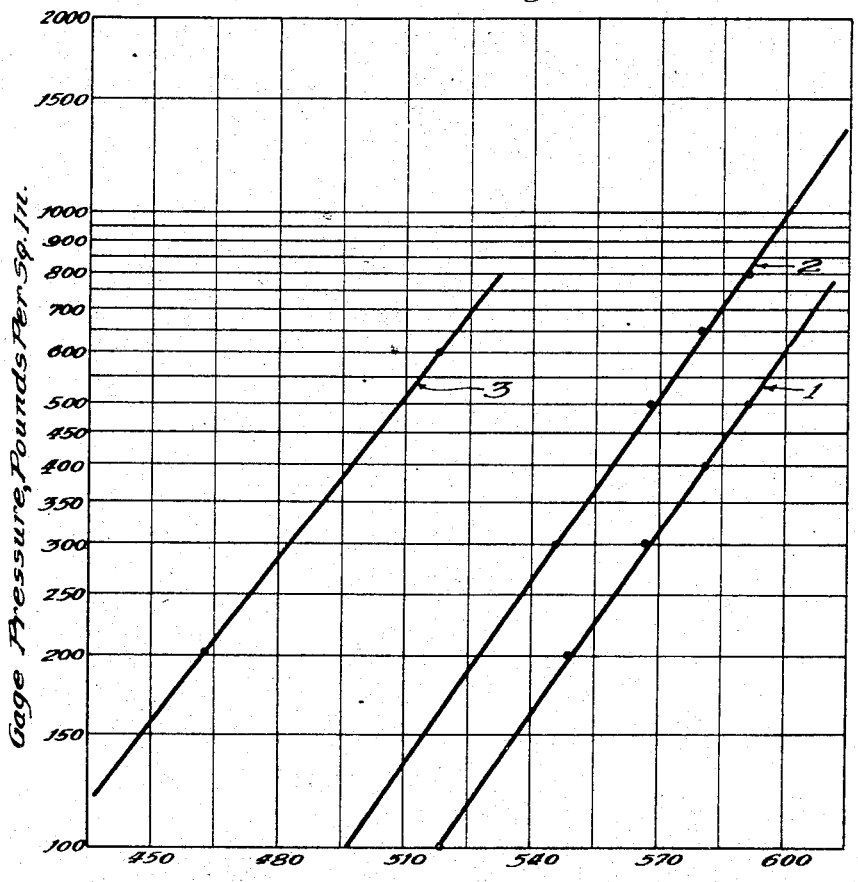

June 24, 1947.  V. HAENSEL ET AL  2,422,674
SELECTIVE DEMETHYLATION OF SATURATED HYDROCARBONS
Filed Oct. 31, 1944  5 Sheets-Sheet 1

Inventors:
Vladimir Haensel
Vladimir N. Ipatieff
By: Lee J. Gary
Attorney.

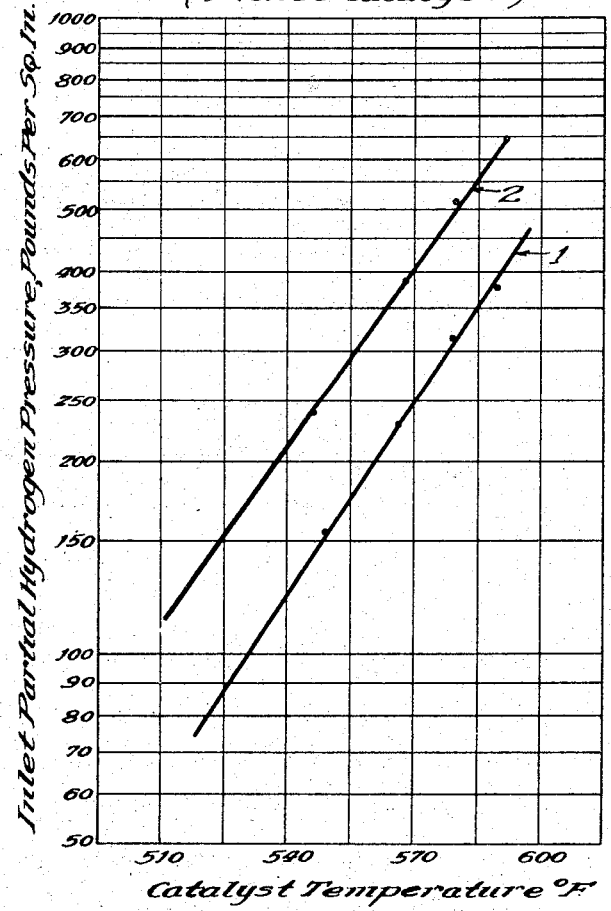

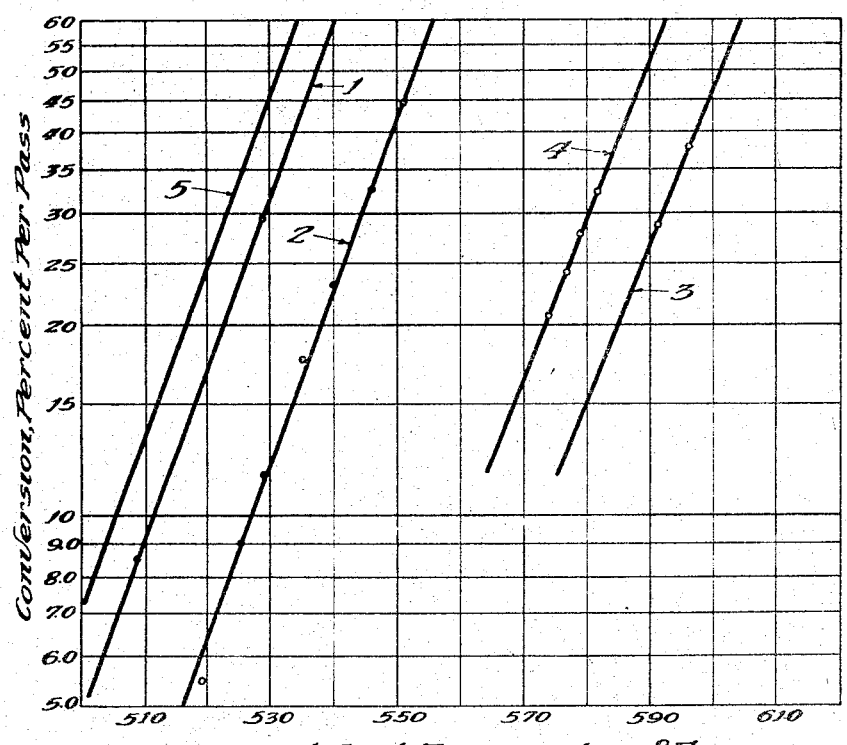

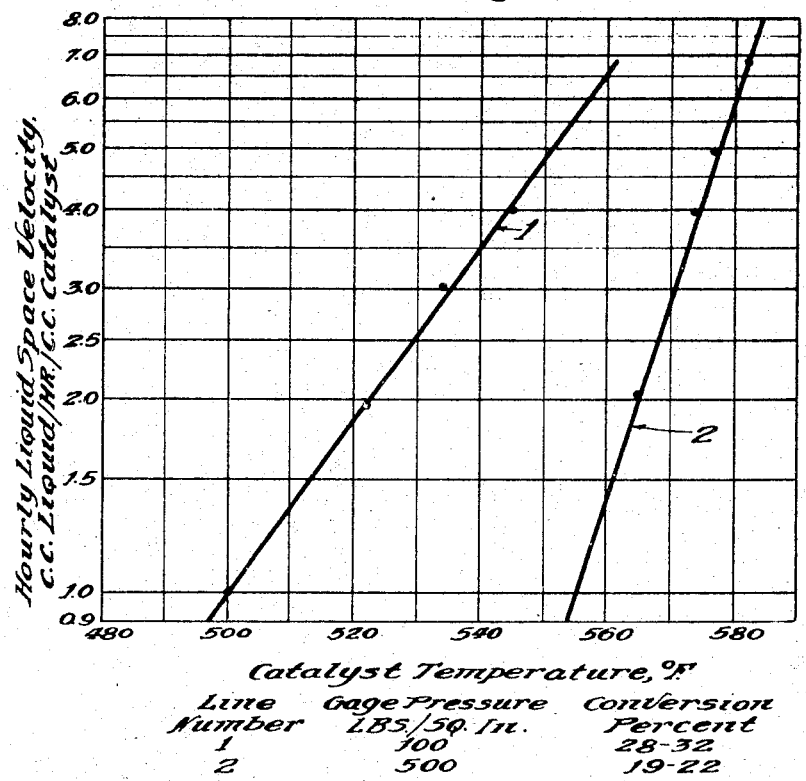

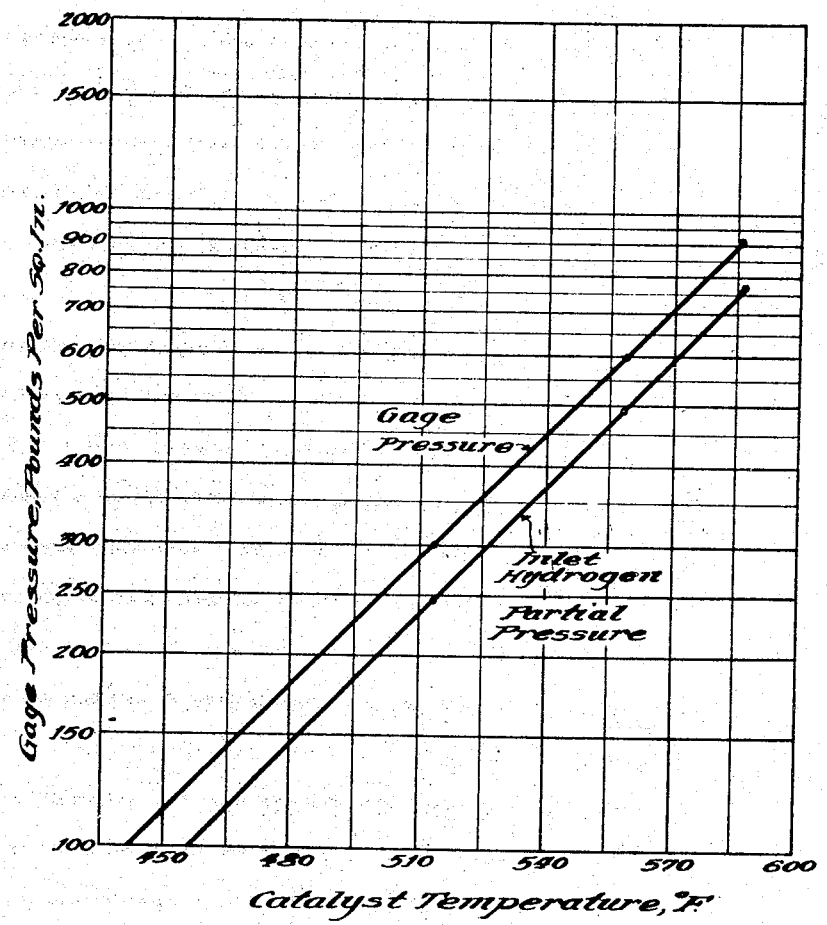

Patented June 24, 1947

2,422,674

UNITED STATES PATENT OFFICE 2,422,674

SELECTIVE DEMETHYLATION OF SATURATED HYDROCARBONS

Vladimir Haensel, Clarendon Hills, and Vladimir N. Ipatieff, Chicago, Ill., assignors to Universal Oil Products Company, Chicago, Ill., a corporation of Delaware Application October 31, 1944, Serial No. 561,186

14 Claims. (Cl. 260—683.6)

This application is a continuation-in-part of our copending applications: Serial Number 475,004, filed February 6, 1943; Serial Numbers 481,266 and 481,270, filed March 31, 1943; and Serial Number 507,890, filed October 27, 1943.

This invention relates to the treatment with hydrogen in the presence of a hydrogenating catalyst of a hydrocarbon to produce therefrom a hydrocarbon containing at least 1 carbon atom less than those present in the hydrocarbon charged to the process. More specifically, our invention is concerned with a catalytic process for treating with hydrogen a hydrocarbon containing more than 4 carbon atoms, including an alkyl group of at least 2 carbon atoms, said process being carried out at closely correlated conditions of temperature, pressure, and charging rate so that the principal reaction of the process is the replacement with hydrogen and the scission of methyl groups, in the form of methane, to the exclusion of alkyl groups of more than 1 carbon atom, to decrease the number of carbon atoms of said hydrocarbon by at least 1 carbon atom.

An object of this invention is the demethylation of a hydrocarbon selected from the group consisting of a paraffin, an alkyl aromatic having an alkyl group containing at least 2 carbon atoms, and a saturated alkyl hydroaromatic having an alkyl group containing at least 2 carbon atoms to produce therefrom a hydrocarbon of lower molecular weight.

Another object of this invention is the demethylation of a saturated aliphatic hydrocarbon containing more than 4 carbon atoms per molecule to produce therefrom a paraffinic hydrocarbon of lower molecular weight.

A further object of this invention is the production of a paraffinic hydrocarbon of lower molecular weight by the catalytic demethylation of a paraffinic hydrocarbon containing more than 4 carbon atoms per molecule.

Another further object of this invention is the treatment of a cyclic hydrocarbon having more than 7 carbon atoms per molecule comprising a ring of 6 carbon atoms and an alkyl side chain of at least 2 carbon atoms to decrease the number of carbon atoms in said alkyl side chain of said hydrocarbon by at least one carbon atom by removing only one methyl group or several methyl groups as methane from said alkyl side chain while retaining a portion of said side chain in chemical combination with said ring.

A still further object of this invention is the treatment of an alkyl aromatic hydrocarbon having an alkyl side chain of at least 2 carbon atoms to decrease the number of carbon atoms in said alkyl side chain by at least one carbon atom by removing only one methyl group or several methyl groups as methane from said alkyl side chain while retaining a portion of said side chain in chemical combination with the aromatic ring.

Another object of this invention is the treatment of a saturated alkyl hydroaromatic hydrocarbon having an alkyl group containing at least 2 carbon atoms to decrease the number of carbon atoms in said alkyl group by at least one carbon atom by removing only one methyl group or several methyl groups as methane from said alkyl group while retaining a portion of said alkyl group in chemical combination with the hydroaromatic ring.

One specific embodiment of the present invention comprises a process of reacting hydrogen with a hydrocarbon containing more than 4 carbon atoms, including an alkyl group of at least 2 carbon atoms, in the presence of a demethylating catalyst at a temperature which is directly proportional to the logarithm of the pressure so as to split from said hydrocarbon only one methyl group or several methyl groups and form a hydrocarbon of lower molecular weight.

A further embodiment of the present invention comprises a process of reacting hydrogen with a paraffinic hydrocarbon containing more than 4 carbon atoms in the presence of a catalyst of the iron group at a temperature which is directly proportional to the logarithm of the pressure so as to split from said hydrocarbon only one methyl group or several methyl groups and form a hydrocarbon of lower molecular weight.

Heretofore destructive hydrogenation methods have been utilized to produce gasoline from higher boiling oils in the presence of various hydrogenating catalysts. Such methods may be regarded as involving essentially the cracking of the higher boiling oils accompanied by hydrogenation of the products of lower molecular weight to form substantially saturated hydrocarbons boiling within the range of gasoline. The present process differs from the destructive hydrogenation treatments of the prior art, particularly in that it specifically involves the demethylation of a hydrocarbon charging stock under definite and specific conditions of operation necessary to effect a high degree of selective demethylation with substantially no accompanying undesired cracking reactions. The present process produces hydrocarbons of lower molecular weights and higher antiknock values than the hydrocarbons treated.

By the term "selective demethylation" we mean the herein-described reaction of a hydrocarbon with hydrogen in the presence of a catalyst whereby certain methyl groups are removed in preference to other groups from a hydrocarbon being subjected to said treatment. For example, the paraffinic hydrocarbon, 2,2,3-trimethylpentane, which has the formula:

$$(CH_3)_3C-CH(CH_3)-CH_2-CH_3$$

has 5 methyl groups, 3 of which groups are combined with the quaternary carbon atom, 1 is bound to the tertiary carbon atom, this tertiary atom being adjacent to the quaternary carbon atom, and the fifth methyl group is the terminal portion of the ethyl group of the 2,2,3-trimethylpentane molecule. The terminal methyl group is combined with the secondary carbon atom of the 2,2,3-trimethylpentane molecule. Accordingly, if any one of the methyl groups attached to the quaternary carbon atom would be removed therefrom by reaction with hydrogen, the products 2,3-dimethylpentane and methane would be formed; whereas the similar splitting of the methyl group from the tertiary carbon atom would result in the formation of 2,2-dimethylpentane and methane. If the fifth methyl group, namely, that which is a part of the ethyl group of the molecule, is removed therefrom, the resultant reaction mixture would contain triptane and methane. Accordingly, if all of the bonds between the different carbon atoms of 2,2,3-trimethylpentane are of equal strength, the probability of forming a dimethylpentane is 4 times that of forming triptane. However, we have found experimental evidence that the bond between the quaternary and the tertiary carbon atoms are stronger than is the bond between the triptyl group and the terminal methyl group of 2,2,3-trimethylpentane. The experiments gave relatively high yields of triptane but a relatively small yield of dimethylpentanes.

We have found that different hydrocarbons which do not contain quaternary carbon atoms may also be demethylated selectively. Thus isopentane was demethylated to relatively high yields of isobutane with relatively low formation of normal butane. Similarly the demethylation of n-hexadecane (also known as cetane) which contains only primary and secondary carbon atoms gave a reaction product containing substantial amounts of pentadecane, tetradecane, tridecane, dodecane, etc. From our work on paraffin hydrocarbons, it was observed that a methyl group that is bound to a secondary carbon atom is the easiest to remove by demethylation, that a methyl group bound to a tertiary carbon atom is less easy to remove, and that a methyl group combined chemically with a quaternary carbon atom is the most difficult type of methyl group to split off in the form of methane. In other words, the relative stabilities to demethylation of the different C—CH$_3$ bonds of a hydrocarbon are in the descending order of quaternary, tertiary, and secondary groupings which are illustrated by the following formulas:

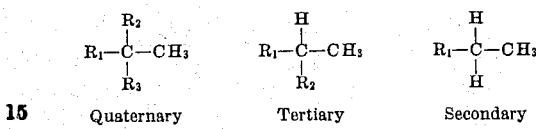

Quaternary     Tertiary     Secondary in which R$_1$ represents an alkyl group of at least 2 carbon atoms and R$_2$ and R$_3$ represent methyl groups.

Hydrocarbons which are demethylated by the process of this invention have more than 4 carbon atoms per molecule including an alkyl group containing at least 2 carbon atoms, and comprise paraffins, alkyl aromatics having alkyl groups containing at least 2 carbon atoms, and saturated alkyl hydroaromatics having alkyl groups containing at least 2 carbon atoms. The paraffinic hydrocarbons include both normal and branched chain paraffins. Alkyl aromatic hydrocarbons having side chains of at least 2 carbon atoms include mono-ethylbenzene, monopropyl and mono-isopropylbenzene, and more highly alkylated mono-alkylbenzenes as well as dialkyl and polyalkyl benzenes, each having an alkyl containing 2 or more carbon atoms. The saturated hydroaromatic hydrocarbons which are also demethylated by the process of our invention include particularly ethylcyclohexane and other alkyl cyclohexanes of higher molecular weight containing at least one alkyl group of 2 or more carbon atoms.

The paraffinic hydrocarbons treated by the process of this invention comprise the normally liquid paraffins and particularly those containing at least 6 carbon atoms per molecule. The process is applicable to both normal and branched chain paraffinic hydrocarbons. When producing triptane, the octane, 2,2,3-trimethylpentane, mentioned above, is a preferred charging stock but this octane is not the only aliphatic hydrocarbon convertible into triptane by our process. Similarly, 2,3,3-trimethylpentane may also be demethylated into triptane, as is also true with certain highly branched nonanes, decanes, and other hydrocarbons containing a triptyl group. By a triptyl group we mean an alkyl group containing a quaternary carbon atom adjacent to a tertiary carbon atom. Thus, a triptyl group contains vicinal tertiary and quaternary carbon atoms.

The chain structures of paraffinic hydrocarbons containing a triptyl group and convertible into triptane by demethylation may be indicated by the following formula in which R$^1$ to R$^6$ represent alkyl groups or hydrogen atoms, but with at least one of the R groups being an alkyl group.

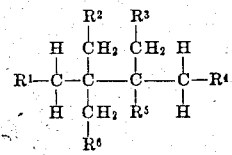

If the hydrocarbon represented by the above structural formula contains a total of $n$ carbon atoms in the groups R$^1$ to R$^6$, inclusive, the demethylation to triptane may be represented by the equation:

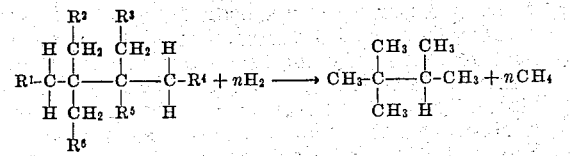

Demethylation of an alkyl aromatic having an alkyl group of at least 2 carbon atoms is illustrated by the following equations for isopropylbenzene and ethylbenzene, respectively.

$$C_6H_5CH(CH_3)_2 + H_2 \rightarrow C_6H_5CH_2-CH_3 + CH_4$$
$$C_6H_5CH_2CH_3 + H_2 \rightarrow C_6H_5CH_3 + CH_4$$

Also, demethylation of a saturated hydroaromatic hydrocarbon having an alkyl group of at least 2 carbon atoms is illustrated by the following equations showing the demethylation of tertiary-butyl-, propyl-, and ethyl-cyclohexanes.

$$C_6H_{11}C(CH_3)_3 + H_2 \rightarrow C_6H_{11}CH(CH_3)_2 + CH_4$$
$$C_6H_{11}CH_2CH_2-CH_3 + H_2 \rightarrow C_6H_{11}CH_2-CH_3 + CH_4$$
$$C_6H_{11}CH_2-CH_3 + H_2 \rightarrow C_6H_{11}CH_3 + CH_4$$

Demethylating catalysts which are preferred for the present process contain metals of the iron group or their oxides. These catalysts, and particularly those containing the metals, nickel and cobalt, are also active hydrogenating catalysts. The different demethylation catalysts comprising metals or metal oxides having hydrogenating activities may be used as such but preferably they are supported by a carrier, such as alumina, silica, diatomaceous earth, crushed porcelain, or some other refractory material which has substantially no adverse influence upon the demethylation.

A highly active nickel catalyst which we used in the present process contained approximately 66% by weight of total nickel, 30% of diatomaceous earth, and 4% of oxygen, the latter present in nickel oxide. This catalyst was made by the general steps of suspending diatomaceous earth, also known as kieselguhr, in a dilute aqueous solution of nickel sulfate and then gradually adding thereto an excess of a hot saturated solution of sodium carbonate. The mixture of nickel sulfate solution and diatomaceous earth was agitated vigorously while the sodium carbonate solution was introduced thereto to form a precipitate which was removed by filtration, and was then washed, dried, heated, and reduced with hydrogen.

The resultant nickel-diatomaceous earth catalyst is employed in powder form when demethylation is effected in batch type treatment or in the fluidized or fluidized fixed bed type of operation. When pelleted or formed catalyst particles are desired, the powdered mixture, preferably before being subjected to reduction with hydrogen or a reducing gas mixture, is mixed with graphite or some other lubricant and formed into pellets by a pilling machine. Other nickel-containing catalysts which may be employed similarly may be prepared to contain proportions of nickel different from those aforementioned.

The reductions of our demethylating catalysts were carried out at a temperature of from about 700° F. to about 1200° F. We found that it was preferable to reduce a nickel-containing catalyst at a temperature of from about 800° to about 1100° F. in order to obtain a demethylating catalyst of such activity that the demethylation reaction could be controlled readily to produce demethylated hydrocarbons containing at least 4 carbon atoms per molecule.

Also we prepared cobalt catalysts by essentially the same series of steps as were used in producing nickel-diatomaceous earth catalyst composites. Diatomaceous earth and cobalt nitrate so proportioned as to give essentially the same ratio of cobalt to silica as of nickel to silica in the above-described catalyst, were mixed with water and then treated with an excess of a hot saturated solution of sodium carbonate. The mixture of cobalt nitrate solution and diatomaceous earth suspended therein was agitated vigorously while the sodium carbonate solution was added thereto to form a precipitate which was removed by filtration and was then washed, dried, and reduced to give an active cobalt-diatomaceous earth catalyst, utilizable in the form of powder or pellets in essentially the same manner as the nickel-diatomaceous earth catalyst.

The process of this invention is carried out by contacting hydrogen and a hydrocarbon with a demethylating catalyst at carefully correlated conditions of temperature and pressure. The temperatures generally employed are from about 350° F. to about 750° F. and the operating pressures are preferably from about 75 to about 3000 pounds per square inch although the process may be operated at pressures below 75 pounds per square inch. In the presence of a catalyst of the iron group our demethylation process is carried out preferably at a temperature of from about 450° to about 650° F.

Accurate control of the demethylation temperature is sometimes difficult because of the exothermic nature of the reaction. Calculations show that when one methyl group is removed as methane from one gram mole of hydrocarbon, approximately 12,500 calories of heat are evolved. Since in the hydrogenation of an olefin, the evolution of about 16,900 calories accompanies the hydrogenation of one double bond per mole of hydrocarbon, it is evident that the removal of one methyl group per mole causes the evolution of approximately 75% as much heat of reaction as does the hydrogenation of a mono-olefin. However, if the demethylation reaction is permitted to proceed further until methane is the only product, the heat of reaction becomes $12,500(n-1)$ calories, where $n$ is the number of carbon atoms in each molecule of the original hydrocarbon charged. Thus if an octane is demethylated completely to methane, the heat of reaction is approximately 87,500 calories per mole. This heat of reaction is approximately 5.2 times the heat evolved upon hydrogenation of octene to octane. Therefore, it is apparent that if the catalyst used in demethylation, for example, of octane, is of such an active nature that excessive conversion or complete conversion to methane takes place readily, the catalyst will undergo a very rapid and excessive rise in temperature. As a result of such a high temperature, the catalyst will undergo a loss in demethylating activity. However, if the catalyst is of a less active nature, the demethylation reaction can be controlled and substantially stopped after only one or two methyl groups have been removed from the hydrocarbon charged to the process. In this case the heat of reaction is sufficiently low that it can be dissipated from the reaction zone fast enough so as to maintain a desired catalyst temperature, and so that relatively high conversions to lower molecular weight hydrocarbons can be attained.

Also, we observed that the manner in which the catalyst was prepared and reduced had an important influence upon its activity and performance in the demethylation process. While nickel catalysts which have been reduced at a temperature of 700° F. may be employed in our demethylation process, we prefer to utilize nickel catalysts which have been reduced with hydrogen and then heated further in hydrogen at a temperature of from about 800° to about 1200° F. prior to use in our demethylation process. After this treatment with hydrogen, the catalyst was of such activity that the demethylation reaction carried out in its presence could be controlled readily at relatively high conversions per pass although we prefer to operate so as to obtain from about 20 to about 50% conversion per pass and to recycle unconverted charging stock. If the catalyst was not given the pretreatment with hydrogen at about 800° to about 1100° F., its initial activity was often so high that the exothermic heat arising from demethylation caused an excessive temperature which not only had a tendency to spoil the activity of the catalyst, but to cause momentary, excessive conversion of the charged hydrocarbon into methane and to generate more exothermic heat of reaction. However, when the activity of the catalyst was modified by the mentioned pretreatment, the demethylation reaction could be controlled and could be substantially stopped after only one or two methyl groups had been removed from the hydrocarbon charged to the process. Under these circumstances the heat of reaction was sufficiently low that it could be dissipated from the reaction zone rapidly enough to maintain a desired catalyst temperature so that relatively high conversions to lower molecular weight hydrocarbons could be attained and so that these conversions could be maintained for relatively long periods of time.

Several nickel catalysts of the type herein described were reduced at 700°, 800°, 1000°, 1100°, and 1200° F., and then used in the demethylation of a trimethylpentane mixture at a pressure of 100 pounds per square inch and at an hourly liquid space velocity of from 0.5 to 0.8 to give 32 to 39% conversion per pass. In these runs the catalyst temperatures needed to obtain such conversions increased with an increase in the reduction temperature of the catalyst. Thus, a catalyst temperature of 425° F. was used to effect 32% conversion of trimethylpentane in the presence of the catalyst reduced at 700° F. while temperatures of 446°, 486°, and 549° F., respectively, were needed for similar conversions in the presence of the catalysts reduced at 800°, 1000°, and 1200° F.

Our demethylation process may be carried out using either batch or continuous types of operation. In the continuous type of treatment, which we generally prefer, a hydrocarbon and a hydrogen-containing gas are passed through a reactor containing a catalyst of the type herein described and the reaction products are discharged continuously from the reactor at substantially the same rate as that at which the reactants are charged thereto. The products of the demethylation treatment are fractionated by suitable means to separate the desired lower boiling hydrocarbons from the unconverted portion of the hydrocarbon material charged to the process, and said unconverted material is recycled to commingle with the hydrocarbon material charged.

Although our process may be carried out at temperatures, pressures, and space velocities within relatively wide ranges of each, it is necessary to closely coordinate or interrelate these operating conditions. That is, within the wider ranges of operating conditions mentioned above, there is a narrow and specific range of catalyst temperature needed for each catalyst, pressure, and space velocity employed in order to obtain selective demethylation and particularly to produce high yields of desired demethylated hydrocarbons containing at least 4 carbon atoms per molecule. It is also necessary to coordinate the operating conditions with the activity of the catalyst. If the operating conditions and catalyst activity are not coordinated properly, demethylation will either not occur, or it will result in excessive formation of methane for a short period of time during which the high heat of the reaction will cause an uncontrollable high temperature which will spoil the catalyst. After a demethylation catalyst has been spoiled by an excessive temperature, the catalyst is of low activity and therefore practically valueless for further demethylation use at the same temperature. However, this same catalyst can sometimes be utilized at higher demethylation temperatures.

When producing triptane by demethylating 2,2,3-trimethylpentane, it is necessary to correlate properly the operating temperature, pressure, catalyst activity, and the partial pressure of hydrogen in the reaction mixture or no triptane will be produced. If the temperature is too low, the 2,2,3-trimethylpentane will pass through the reactor without undergoing change, while if the temperature is too high, the 2,2,3-trimethylpentane converted will be converted mainly into methane.

We have found that by correlating carefully the conversion conditions of temperature, pressure, and hydrocarbon charging rate with the amounts of hydrogen and hydrocarbon charged, it is possible to effect as the principal reaction of the process a decrease in the number of carbon atoms in said hydrocarbon by at least one carbon atom by removing only methyl groups generally from the least substituted carbon atom in the longest chain of said hydrocarbon.

In our process we have observed that an increase in operating pressure and in hydrogen partial pressure must be accompanied by an increase in catalyst temperature in order to maintain a given conversion of a trimethylpentane mixture into heptanes and other demethylated hydrocarbons, the latter containing 4, 5, and 6 carbon atoms per molecule. Such relationships between operating temperature and pressure for trimethylpentane conversions of about 20, 30, and 50% in the presence of a nickel catalyst at the respective average hourly liquid space velocities of 0.75, 2.0, and 1.6 are expressed by the three curves (which are straight lines) shown in Figure 1. Each of these lines was obtained by plotting the catalyst temperature for the particular conversion against the logarithm of the total gage pressure in pounds per square inch. As indicated by Table 1 and by line 1 of Figure 1, the catalyst temperature necessary for about 50% conversion increased from 519° F. at a gage pressure of 100 pounds per square inch to 591° F. at 500 pounds' pressure. Similarly, in other runs at 2.0 space velocity giving about 30% conversion, the catalyst temperature was 546° F. at 300 pounds and 591° F. at 800 pounds' pressure. These results are shown by line 2 of Figure 1. For a still smaller conversion of about 20% at a space velocity of 0.75 as shown by line 3 the catalyst temperature was 463° F. at 200 pounds' pressure and 518° F. at 600 pounds' pressure.

The catalyst temperature needed for demethylation, for example of a trimethylpentane mixture in the presence of a nickel catalyst, is also directly proportional to the logarithm of the partial pressure of hydrogen present in the reaction mixture. Some of the results obtained as described above and included in Figure 1 have also been utilized in preparing Figure 2 in which lines 1 and 2 are similar to lines 1 and 2 of Figure 1 except that in Figure 2 the lines 1 and 2 indicate the variations of catalyst temperatures with the inlet partial pressures of hydrogen which are also included in Table 1 as a part of Example I.

This relationship of reaction temperature to pressure which we found to exist in our demethylation process is opposite to that observed previously in the hydrogenation of olefins where an increase in hydrogenation pressure makes it possible to use a lower catalyst temperature to effect a constant percentage hydrogenation of the olefins charged.

In the presence of the mentioned nickel catalyst, the same relationship between catalyst temperature and reaction pressure as given in Figure 1 does not hold at gage pressures below about 75 pounds per square inch. However, the results which we have obtained do indicate that in order to start the demethylation reaction at pressures below about 75 pounds per square inch, higher catalyst temperatures are needed when the reaction mixture being treated has a high partial pressure of hydrogen. For higher conversions to demethylation products at these relatively low operating pressures, no rigid correlation of catalyst temperature and hydrogen partial pressure appears to exist.

Although with no intention of unduly limiting the scope of our invention, we offer the following suggesions as to why, in order to produce a nearly constant yield of demethylation products, the catalyst temperature may be varied over a relatively wide range of pressures below about 75 pounds per square inch. In the demethylation process it appears essential to substantially balance the extents of adsorption of both hydrogen and hydrocarbon upon the catalyst. When either the hydrocarbon or the hydrogen is adsorbed to a preponderating excess over the other, the demethylation reaction cannot occur. At high hydrogen partial pressure, we believe that most of the catalyst surface is covered with adsorbed hydrogen and that only a small amount of catalyst surface is available for contact with the hydrocarbon. Therefore, as the hydrogen partial pressure is increased, it is necessary to increase the catalyst temperature in order to desorb some of the hydrogen and permit adsorption of some of the hydrocarbon. At low hydrogen partial pressures, the hydrogen adsorption is naturally low and accordingly the demethylation reaction can start at a relatively low temperature. However, as the temperature is increased, in order to increase the rate of demethylation, the adsorption of hydrogen decreases simultaneously. Accordingly an increase in the rate of reaction due to an increase in temperature is offset substantially by the decrease in the amount of hydrogen adsorbed on the catalyst. Thus at low pressures the effects of temperature and adsorption work against each other and the catalyst temperature needed to obtain substantial yields of demethylation products can be varied over a considerable range, whereas at higher pressures this cannot be done.

Our correlations of operating temperature and pressure (above about 75 pounds per square inch) with percentage conversion is illustrated further by the lines shown in Figure 3. By reference to lines 1 and 2 of Figure 3 and to the data given in Table 2, it is noted that in runs at 300 pounds' gage pressure the catalyst temperature needed for a given conversion was about 15° F. higher when using approximately 2.0 hourly liquid space velocity than when operating similarly at a space velocity of 1.0. Also, by comparing lines 2 and 3 of Figure 3, it is noted that the operating temperature needed at 800 pounds' pressure for a given percentage conversion at 2.0 average space velocity was about 45° F. higher than needed to give the same conversion in similar runs at 300 pounds' pressure. Also line 4 shows the effect of catalyst temperature upon conversion at a pressure of 500 pounds per square inch and at an hourly liquid spaced velocity of 4.0.

Also, we found that the rate at which the hydrocarbon was charged had an influence upon the catalyst temperature needed for demethylation to constant conversion at a given operating pressure. Thus, when treating a trimethylpentane mixture with hydrogen in the presence of the aforementioned nickel catalyst at 100 and at 500 pounds' pressure, the relationship found to exist between catalyst temperature and hourly liquid space velocity of charge is expressed by the two lines shown in Figure 4 and by the data given in Table 3. From these results it is noted that at 100 pounds' pressure and for an average conversion of about 30% (line 1 of Figure 4), a catalyst temperature of 500° F. was required when using 1.0 hourly liquid space velocity of trimethylpentane mixture, and a temperature of 545° F. when employing 4.0 hourly liquid space velocity. When the process was conducted at 500 pounds' pressure to give about 20% conversion per pass, (line 2 of Figure 4), the catalyst temperature needed was 565° F. when employing 2.0 space velocity, and 579° F. when operating with 6.9 hourly liquid space velocity. In these runs, about 4 molar proportions of hydrogen were charged per molar proportion of trimethylpentane mixture.

Variations in the proportions of hydrogen and hydrocarbon charged to the process had some influence upon the catalyst temperature needed for a given conversion. When this ratio was lowered from 3.1 to 1.7, the catalyst temperature necessary to effect about 50% conversion remained about the same, but when this ratio was increased from 3.1 to 6.9, it was necessary to increase the catalyst temperature by about 10° F. in order to maintain the same percentage conversion per pass.

Also, in the demethylation of a trimethylpentane fraction in the presence of a cobalt-diatomaceous earth catalyst, a relationship existed between the catalyst temperature and the operating pressure. Thus, with a cobalt - diatomaceous earth catalyst prepared in essentially the manner herein described and reduced with hydrogen at a temperature of 850° F., a catalyst temperature of 514° F. was needed to effect 21% by weight conversion at a gage pressure of 300 pounds per square inch, while a temperature of 559° F. was needed for similar conversion at a gage pressure of 600 pounds per square inch. In these runs, the trimethylpentane mixture was charged at an hourly liquid space velocity of 2, and 4.8 molar proportions of hydrogen were used per molar proportion of trimethylpentane. In another run, 30% conversion of trimethylpentane was obtained in the presence of a cobalt catalyst at a catalyst temperature of 586° F. and at a gage pressure of 910 pounds per square inch. These results are shown in Figure 5 and in Table 9 of Example IX.

With each new demethylation catalyst and charging stock it is preferable to make a test run in order to determine a catalyst temperature suitable for obtaining demethylation at a chosen pressure and hydrogen partial pressure or molar ratio of hydrogen to charging stock. Such an experimentally determined temperature value will then serve as a reference point by which the figures and data given in this specification may be used to estimate the proper catalyst temperature to use at other conversions, pressures, hydrocarbon charging rates (referred to herein by the term space velocity), hydrogen partial pressures, etc.

In making such a test run on a catalyst, the mixture of hydrogen and hydrocarbon charging stock, for example, at a pressure of about 100 pounds per square inch (gage pressure) is passed through a pressure reactor containing the catalyst while the temperature of the reactor and catalyst is increased gradually and samples of the liquid products are collected and investigated in order to determine the percentage conversion per pass. When demethylating paraffins, we have found that a measurement of the refractive index of the liquid reaction product is a quick and simple method of determining whether demethylation has occurred because the refractive index of a paraffin hydrocarbon or hydrocarbon mixture has a lower value when even a small part of it has undergone demethylation. Refractive index measurements are also convenient, for example, for determining the percentage of triptane in a mixture of 2,2,3-trimethylpentane and triptane such as is produced by demethylation of said trimethylpentane.

The following discussion is given in order to illustrate a method by which the figures and data given in this specification may be used to estimate the catalyst temperature and other conditions of operation necessary to obtain a desired yield of demethylation products based upon the information gained from a test run. Suppose a test run made in the presence of a new nickel catalyst of unknown activity at a temperature of 510° F., a pressure of 100 pounds per square inch, a charging rate of trimethylpentane mixture expressed as an hourly liquid space velocity of 1.0, and a hydrogen to trimethylpentane ratio of 4 yielded 13% of liquid demethylation products per pass. Using the results of this test run, line 5 is then drawn in Figure 3 through the point representing 13% conversion at 510° F. and parallel to the other four lines of Figure 3 since these lines are substantially parallel. From line 5 it is noted that a temperature of 524° F. would be needed to obtain 28–32% conversion of trimethylpentane in the presence of this catalyst at a pressure of 100 pounds per square inch. However, it is desirable to use this catalyst at an hourly liquid space velocity of 2.0 in order to have greater plant capacity, but it is necessary to maintain about 30% conversion of the trimethylpentane mixture into demethylation products. From line 1 of Figure 4 it is seen that a temperature increase of 23° F. (500° to 523° F.) was needed to maintain about 30% conversion in the presence of a similar catalyst when the charging rate of the trimethylpentane mixture was increased from 1.0 to 2.0 hourly liquid space velocity. Accordingly, with the new catalyst it is estimated that since a catalyst temperature of 524° F. would be required for about 30% conversion at 1.0 hourly liquid space velocity, it would be necessary to use a catalyst temperature of about 547° F. (that is, 524° plus 23° F.) to maintain the same conversion at 2.0 hourly liquid space velocity and at a pressure of 100 pounds per square inch.

Also, if it is further desired to operate the process at a pressure of 500 pounds per square inch instead of at 100 pounds per square inch at 2.0 hourly liquid space velocity, the information given in Figure 1 may be used to estimate the catalyst temperature needed to obtain the desired conversion of about 30% per pass. From line 2 of Figure 1 it is noted that in the presence of a similar catalyst it was necessary to increase the catalyst temperature by about 72° F., (that is from 496° to 568° F.), when the pressure was increased from 100 to 500 pounds per square inch and when operating at 2.0 hourly liquid space velocity. Accordingly, in the run proposed at a pressure of 500 pounds per square inch, it is estimated that a catalyst temperature of 619° F. (that is, 547° plus 72° F.) would be needed to obtain about 30% conversion of the trimethylpentane mixture into normally liquid demethylation products. However, in making the proposed run at 500 pounds' pressure and 2.0 space velocity to obtain 30% demethylation per pass, it would be advisable to start the run at a temperature lower than the estimated 619° F., for example at perhaps 590° F., because demethylation catalyst (particularly fresh catalyst) often exhibits a substantial heat of adsorption at the beginning of a run. Such heat given out because of adsorption might be sufficient to increase the catalyst temperature enough to cause excessive demethylation of the charged hydrocarbon and to spoil the catalyst. After the run has been started, the demethylation temperature is then increased so as to approach gradually the temperature needed to give the desired percentage conversion such as about 30%. As the catalyst temperature is thus increased, the reaction products are analyzed to determine the amount of demethylation effected.

Our process is not limited to any particular type of apparatus or composition of the preferred catalysts, but depends for its successful operation upon the use of particular temperatures along with proper pressures and times of contact suitable to the different charging stocks and to the demethylation catalysts utilized.

The following examples are given to illustrate the process of this invention, although with no intention of limiting unduly its generally broad scope.

EXAMPLE I

A nickel-diatomaceous earth catalyst prepared as hereinabove set forth was heated in a stream of hydrogen at 1000° F. for 12 hours and then cooled to room temperature after which a mixture of nitrogen and air was passed through the reduced catalyst to render it substantially non-pyrophoric. The resultant catalyst was then used as a granular filler in a steel reactor through which hydrogen and a trimethylpentane mixture, the latter consisting of approximately 35% of 2,2,3-trimethylpentane, 10% of 2,3,3-trimethylpentane, and 55% of 2,3,4-trimethylpentane, were passed at pressures of from 100 to 800 pounds per square inch. Results obtained in these runs (runs 1–5, inclusive) are shown in Table 1. Runs 6–9 were made similarly on some of the same catalyst which had been used previously in demethylating octanes for 343 hours.

TABLE 1

*Effect of pressure upon catalyst temperature needed for demethylation of a trimethylpentane mixture*

| Run No. | Total Gage Pressure, Lbs. per Sq. In. | Hydrogen Partial Pressure, Lbs. per Sq. In. | Molar Ratio H₂:C₈H₁₈ | Hourly Liq. Space. Vel. | Conversion to Lower Hydrocarbons, Per Cent Per Pass | Catalyst Temp., °F. |
|---|---|---|---|---|---|---|
| 1 | 100 | 76 | 3.1 | 1.7 | 48 | 519 |
| 2 | 200 | 157 | 3.7 | 1.5 | 49 | 549 |
| 3 | 300 | 230 | 3.3 | 1.6 | 51 | 567 |
| 4 | 400 | 318 | 3.9 | 1.5 | 48 | 581 |
| 5 | 500 | 392 | 3.6 | 1.5 | 51 | 591 |
| 6 | 300 | 242 | 4.2 | 2.0 | 32 | 546 |
| 7 | 500 | 398 | 3.9 | 2.0 | 28 | 568 |
| 8 | 650 | 520 | 4.0 | 2.0 | 30 | 580 |
| 9 | 800 | 646 | 4.2 | 1.9 | 28 | 591 |

The demethylation run of 343 hours' duration referred to above was made by charging the trimethylpentane mixture of the above-indicated composition through a larger steel reactor at a catalyst temperature of 528° to 532° F. at 300 pounds' gage pressure using 1.5 liquid space velocity of trimethylpentane and a hydrogen to trimethylpentane molar ratio of 4:1. During this run the conversion of trimethylpentane into lower hydrocarbons was 35 to 45% per pass with an average conversion of 40% for the entire run.

The lower hydrocarbons obtained when the conversion was 35% per pass had the following composition expressed as liquid volume per cent of the total liquid products boiling lower than the unconverted charging stock, the latter being suitable for recycling to the process.

| Demethylation Products | Liquid Volume, Per Cent |
|---|---|
| Pentane (mainly neopentane) | 6.1 |
| 2,3-Dimethylbutane | 18.1 |
| Triptane blend containing about 90% of triptane (2,2,3-trimethylbutane) | 53.9 |
| 2,3-Dimethylpentane | 22.9 |
| Total | 100.0 |

The above indicated composition of a demethylation product is typical of others obtained from the described trimethylpentane mixture in other runs at different operating conditions.

A similar nickel catalyst which had been reduced at 800° F. gave 21–22% conversion to lower hydrocarbons per pass when employed similarly at total pressures of 200 and 600 pounds per square inch while using an hourly liquid space velocity of 0.7 and hydrogen : octane ratios of 1.8 and 2.6, respectively. In order to obtain the mentioned conversion, a catalyst temperature of 463° F. was required in the run at 200 pounds' gage pressure while a temperature of 518° F. was used in the run at 600 pounds' pressure. The results of these two runs and of those referred to in Table 1 are presented graphically in Figure 1 aforementioned. Figure 2 shows the relationship of catalyst temperature to hydrogen partial pressure at the inlet of the catalyst reactor.

EXAMPLE II

The catalyst prepared as described in Example I and reduced at 1000° F. was employed in a number of other runs at different temperatures to determine the influence of catalyst temperature on the conversion to lower hydrocarbons. Results obtained in such runs at 300, 500, and 800 pounds' pressure are shown in Table 2. These results are also indicated graphically in Figure 3.

TABLE 2

*Effect of catalyst temperature upon conversion of trimethylpentane mixture into lower boiling hydrocarbons*

| Run No. | Total Gage Pressure, Lbs. per Sq. In. | Molar Ratio H₂:C₈H₁₈ | Hourly Liq. Space Vel. | Conversion to Lower Hydrocarbons, Per Cent Per Pass | Catalyst Temp., °F. |
|---|---|---|---|---|---|
| 26 | 300 | 3.9 | 1.0 | 8 | 509 |
| 27 | 300 | 3.8 | 1.0 | 29 | 529 |
| 12 | 300 | 4.1 | 1.9 | 5 | 519 |
| 13 | 300 | 4.1 | 1.9 | 9 | 525 |
| 14 | 300 | 4.5 | 1.9 | 11 | 529 |
| 15 | 300 | 3.9 | 2.0 | 17 | 535 |
| 16 | 300 | 4.1 | 2.0 | 23 | 540 |
| 6 | 300 | 4.2 | 2.0 | 32 | 546 |
| 17 | 300 | 4.2 | 2.0 | 44 | 551 |
| 21 | 500 | 4.1 | 4.0 | 21 | 574 |
| 22 | 500 | 4.0 | 4.0 | 25 | 577 |
| 23 | 500 | 4.4 | 3.9 | 27 | 579 |
| 24 | 500 | 4.1 | 3.9 | 32 | 582 |
| 9 | 800 | 4.2 | 1.9 | 28 | 591 |
| 25 | 800 | 4.0 | 2.0 | 37 | 596 |

EXAMPLE III

The procedure employed and some of the same catalyst used in Examples I and II were utilized in determining the influence of trimethylpentane charging rate upon the catalyst temperature needed to effect about 20 and about 30% conversion into lower boiling hydrocarbons by catalytic demethylation. The results obtained in some of these runs at pressures of 100 and at 500 pounds per square inch are given in Table 3 and in Figure 4.

TABLE 3

*Effect of space velocity and contact time upon catalyst temperature*

| Run No. | Total Gage Pressure, Lbs. per Sq. In. | Contact Time, Secs. | Molar Ratio H₂:C₈H₁₈ | Hourly Liq. Space Vel. | Conversion to Lower Hydrocarbons, Per Cent Per Pass | Catalyst Temp., °F. |
|---|---|---|---|---|---|---|
| 31 | 100 | 20 | 4.0 | 1.0 | 30.1 | 500 |
| 32 | 100 | 10 | 4.1 | 2.0 | 31.7 | 522 |
| 33 | 100 | 6 | 4.1 | 3.0 | 28.2 | 534 |
| 34 | 100 | 5 | 4.1 | 4.0 | 28.0 | 545 |
| 28 | 500 | 45 | 3.8 | 2.0 | 21.5 | 565 |
| 21 | 500 | 21 | 4.1 | 4.0 | 20.6 | 574 |
| 29 | 500 | 16 | 4.0 | 4.9 | 25.5 | 580 |
| 30 | 500 | 13 | 3.8 | 6.9 | 18.9 | 579 |

At a constant pressure and while employing a substantially constant hydrogen : octane molar ratio of about 4, an increase in the hourly liquid space velocity of the hydrocarbon charged made it necessary to employ a higher catalyst temperature in order to maintain constant conversion. In other words, a higher catalyst temperature was needed when the time of contact of the hydrocarbon and catalyst was decreased. The times of contact listed in Table 3 were calculated on the basis of the total volume of catalyst present in the reaction zone and not upon the basis of the free space in the catalyst layer.

EXAMPLE IV

Several demethylation runs were made on similar nickel-diatomaceous earth catalysts prepared as herein described and reduced at different temperatures of from 700° to 1200° F. These catalysts were then employed in comparative runs at a pressure of 100 pounds per square inch and at charging rates corresponding to hourly liquid space velocities of 0.5-0.8 with hydrogen : octane molar ratios of 1.7 to 2.7 as indicated by the results in Table 4. It was necessary to employ catalyst temperatures of from 425° to 549° F. in order to obtain 32-39% conversion in the presence of these catalysts which have been reduced at these temperatures of from about 700° to about 1200° F.

TABLE 4

*Effect of catalyst reduction temperature upon catalyst temperature required for demethylation*

| Run No. | Cat. Redn. Temp., °F. | Total Gage Pressure, Lbs. per Sq. In. | Molar Ratio H₂:C₈H₁₈ | Hourly Liq. Space Vel. | Conversion to Lower Hydrocarbons, Per Cent Per Pass | Catalyst Temp., °F. |
|---|---|---|---|---|---|---|
| 44 | 700 | 100 | 1.7 | .8 | 32 | 425 |
| 45 | 800 | 100 | 2.7 | .5 | 33 | 446 |
| 46 | 1,000 | 100 | 2.1 | .6 | 34 | 486 |
| 47 | 1,200 | 100 | 2.3 | .6 | 39 | 549 |

EXAMPLE V

Several runs were made on the demethylation of the aforementioned trimethylpentane mixture in the presence of the catalyst referred to in Example II and at pressures of from substantially atmospheric to 100 pounds per square inch. Some of these results are given in Table 5.

TABLE 5

*Demethylation of trimethylpentane mixture at pressures of from substantially atmospheric to 100 pounds per square inch*

| Run No. | Total Gage Pressure, Lbs. per Sq. In. | Molar Ratio H₂:C₈H₁₈ | Hourly Liq. Space Vel. | Conversion to Lower Hydrocarbons, Per Cent Per Pass | Catalyst Temp., °F. |
|---|---|---|---|---|---|
| 37 | atm. | 3.2 | 1.7 | 27 | 514 |
| 38 | atm. | 3.9 | 1.5 | 32 | 540 |
| 39 | 25 | 3.3 | 1.6 | 44 | 535 |
| 40 | 25 | 3.7 | 1.5 | 51 | 573 |
| 41 | 38 | 3.5 | 1.6 | 48 | 540 |
| 42 | 50 | 3.6 | 1.5 | 48 | 515 |
| 1 | 100 | 3.1 | 1.7 | 48 | 519 |

The results obtained show that at pressures below about 75 pounds per square inch, the catalyst temperature can be varied within relatively wide limits without affecting appreciably the amount of conversion. For example, in run number 41 at a gage pressure of 38 pounds per square inch, the catalyst temperature was increased until at 540° F. the catalyst underwent an excessive rise in temperature. In runs numbers 39 and 40 at a pressure of 25 pounds per square inch, the catalyst temperature was increased from 535° F. to 573° F. with only a small increase in the percentage conversion per pass.

EXAMPLE VI

Neohexane was subjected to catalytic demethylation in the presence of the catalyst described in Example II using the same procedure. In these runs, from about 18 to about 40% of the neohexane was converted into neopentane, while the total conversion of neohexane into lower boiling hydrocarbons (including neopentane and isobutane) was 28 to 51% per pass. As shown by the results given in Table 6, catalyst temperatures between 433° and 611° F. were employed at pressures of from substantially atmospheric to 500 pounds per square inch using hourly liquid space velocities of neohexane of from 0.5 to 1.6 and varying the hydrogen : neohexane molar ratio between 2.6 and 11.2.

TABLE 6

*Demethylation of neohexane (90% pure)*

| Run No. | Total Gage Pressure, Lbs. per Sq. In. | Molar Ratio H₂:C₆H₁₄ | Hourly Liq. Space Vel. | Conversion to Neopentane, Mole Per Cent | Total Conversion, Mole Per Cent | Catalyst Temp., °F. |
|---|---|---|---|---|---|---|
| 48 | Atm. | 3.1 | .5 | 32 | 39 | 433 |
| 49 | Atm. | 3.1 | .5 | 38 | 47 | 445 |
| 50 | 100 | 2.6 | .6 | 18 | 28 | 511 |
| 51 | 100 | 4.3 | .6 | 40 | 51 | 537 |
| 52 | 300 | 8.9 | 1.6 | 29 | 42 | 561 |
| 53 | 500 | 11.2 | 1.5 | 22 | 37 | 611 |

EXAMPLE VII

The catalyst and procedure of Example I were utilized in demethylating several alkyl cyclohexane hydrocarbons at a gage pressure of 200 pounds per square inch using a hydrogen : hydrocarbon molar ratio of 5 and charging the alkyl cyclohexane hydrocarbon at an hourly liquid space velocity of from 1.5 to 1.9. The catalyst temperatures utilized and the composition of the products obtained in these runs are shown in Table 7.

TABLE 7

*Demethylation of some alkyl cyclohexane hydrocarbons*

| Run No. | Charging Stock | Hourly Liq. Space Vel. | Catalyst Temp., °F. | Composition of Product, Per Cent by Volume |
|---|---|---|---|---|
| 54 | ethylcyclohexane | 1.5 | 550 | 30% methylcyclohexane, 70% ethylcyclohexane. |
| 55 | 1-methyl-4-isopropylcyclohexane | 1.6 | 564 | 7% 1,4-dimethylcyclohexane, 16% 1-methyl-4-ethylcyclohexane, 77% 1-methyl-4-isopropylcyclohexane. |
| 56 | sec-butylcyclohexane | 1.7 | 491 | 5% ethylcyclohexane, 38% propylcyclohexane, 57% sec-butylcyclohexane. |
| 57 | tert-butylcyclohexane | 1.6 | 552 | 8% methylcyclohexane, 14% ethylcyclohexane, 10% isopropylcyclohexane 68% tert-butylcyclohexane. |
| 58 | 1-methyl-4-tert-butylcyclohexane | 1.9 | 536 | 1% methylcyclohexane, 5% 1-methyl-4-ethylcyclohexane, 11% 1-methyl-4-propylcyclohexane, 83% 1-methyl-4-tert-butylcyclohexane. |

From the above results it appears that secondary butyl cyclohexane undergoes demethylation at a lower temperature than that needed to effect similar conversion of the other alkyl cyclohexane hydrocarbons listed in Table 7.

EXAMPLE VIII

Isopropylbenzene was demethylated to a substantial extent at atmospheric pressure in the presence of the catalyst referred to in Example II. In these runs, 3.6–4.0 moles of hydrogen were charged per mole of isopropylbenzene, the latter being charged at an hourly liquid space velocity of 1.4. The yields of toluene and ethylbenzene obtained at catalyst temperatures between 523° and 578° F. are shown in Table 8. The gas produced in these runs contained only hydrogen and methane.

TABLE 8

*Demethylation of isopropylbenzene at atmospheric pressure*

| Run No. | Molar Ratio $H_2:C_9H_{12}$ | Catalyst Temp., °F. | Yields per pass, per cent isopropyl benzene charged | |
|---|---|---|---|---|
| | | | Toluene | Ethylbenzene |
| 59 | 3.9 | 523 | 1.1 | 13.8 |
| 60 | 4.0 | 534 | 5.2 | 17.4 |
| 61 | 4.0 | 559 | 9.0 | 13.2 |
| 62 | 3.6 | 578 | 9.7 | 10.0 |

EXAMPLE IX

A cobalt-diatomaceous earth catalyst was prepared in the same manner as was the nickel-diatomaceous earth catalyst described in Example I with the exception that the cobalt carbonate was decomposed by heating before being formed into pellets. The pelleted cobalt-diatomaceous earth catalyst was reduced by heating in hydrogen at 700° F. for 16 hours and then by continuing the heating in hydrogen at 850° F. for 24 hours. The catalyst was then cooled to about 70° F. and used as a filler in a reactor through which 4.8 molecular proportions of hydrogen and 1 molecular proportion of trimethylpentane were passed at the conditions shown in Table 9. In each of these runs the trimethylpentane mixture was charged at an hourly liquid space velocity of 2.0.

TABLE 9

*Demethylation of trimethylpentane mixture in the presence of cobalt-diatomaceous earth catalyst*

| Run No. | 63 | 64 | 65 |
|---|---|---|---|
| Catalyst Temp., ° F. | 514 | 559 | 586 |
| Total Gage Pressure, Lbs. per Sq. In. | 300 | 600 | 910 |
| Partial Hydrogen Pressure, Lbs. per Sq. In. | 248 | 496 | 754 |
| Conversion to Lower Hydrocarbons, Per Cent Per Pass | 21 | 22 | 30 |

Figure 5 which is based upon the experimental results given in Table 9 shows that the logarithm of the gage pressure was proportional to the catalyst temperature needed to effect 21–30% conversion of the trimethylpentane mixture per pass into lower boiling paraffinic hydrocarbons comprising a substantial proportion of triptane. Similarly, the demethylation temperature was directly proportional to the logarithm of the partial pressure of hydrogen in the mixture of trimethylpentanes and hydrogen entering the reactor which contained the cobalt catalyst.

EXAMPLE X

Several demethylation runs were made at a pressure of 300 pounds per square inch on the trimethylpentane mixture mentioned in Example I using a trimethylpentane charging rate corresponding to an hourly liquid space velocity of 2.0, and carrying out the reaction in the presence of some of the same nickel-diatomaceous earth catalyst which had been pretreated with hydrogen at 1000° F. These runs were made to determine the effect of diluting the processing gas with methane. Some of the results so obtained are given in the three runs listed in Table 10. In the first of these runs the hydrogen: trimethylpentane molar ratio was 2:1 using pure hydrogen; in the second run, the same hydrogen : trimethylpentane ratio was used but the hydrogen was diluted with methane; and in the third run, pure hydrogen was used in a larger amount so that the ratio of processing gas : trimethylpentane was the same as was this ratio in the second run.

TABLE 10

*Effect on methane dilution of processing gas upon temperature needed for demethylation of a trimethylpentane mixture in the presence of a nickel catalyst*

| Run No. | 66 | 67 | 68 |
|---|---|---|---|
| Average Catalyst Temp., °F. | 553 | 525 | 576 |
| Jacket Temp. of Catalyst Reactor, °F. | 545 | 517 | 567 |
| Partial Hydrogen Pressure, Lbs. per Sq. In. | 202 | 87 | 256 |
| Composition of Process Gas, Mole Per cent: | | | |
| Hydrogen | 100 | 34 | 100 |
| Methane | | 66 | |
| Gas: trimethylpentane Molar Ratio | 2.0 | 5.7 | 5.8 |
| Liquid Recovery, Per Cent by Volume | 93 | 99 | 92 |
| Refractive index, $n_D^{20}$ | 1.3966 | 1.3962 | 1.3968 |
| Conversion, per cent by weight of heptane and lower hydrocarbons | 34 | 26 | 33 |
| Exit gas analysis, mole per cent: | | | |
| Hydrogen | 83 | 29 | 90 |
| Methane | 17 | 71 | 10 |

The introduction of methane as a diluent in the processing gas while maintaining the same hydrogen : trimethylpentane ratio resulted in the lowering of the required catalyst temperature for between 26 and 34% conversion by about 28° F. This decrease was in spite of the fact that the time of contact of the hydrocarbon and hydrogen was shorter when methane was present in the reaction mixture. When the same contact time was employed by substituting methane for a part of the hydrogen, the required catalyst temperature was lowered by about 51° F. These results indicate that the hydrogen partial pressure influences greatly the demethylation reaction and particularly the catalyst temperature at which said reaction occurs as indicated by Figure 2.

EXAMPLE XI

A nickel-diatomaceous earth catalyst which had been reduced with hydrogen at 1000° F. was used as a filler in a steel reactor through which isopentane was passed at 586°-F. and at a gage pressure of 300 pounds per square inch using a charging rate of isopentane corresponding to 2.1 hourly liquid space velocity and a hydrogen to isopentane molar ratio of 4.0. In this run 26.3% of the isopentane was converted into lower boiling hydrocarbons in one pass. The reaction product recovered with molecular weight higher than that of methane had the following composition:

Mole per cent

Propane _____ 2.1
Isobutane _____ 22.3
n-Butane _____ 1.9
Isopentane _____ 73.3
n-Pentane _____ 0.3
Hexane and higher_____ 0.1

The ratio of isobutane to normal butane in the product was 11.7:1 while the calculated statistical ratio is 1:2, indicating a "selectivity ratio" of 23.4:1 for the removal of the methyl group attached to the secondary carbon atom. This run thus shows that selective demethylation is applicable to hydrocarbons having a quaternary carbon atom but containing primary, secondary, and tertiary carbon atoms. Thus the demethylation reaction is well suited to converting pentanes and higher paraffins into lower boiling paraffinic hydrocarbons.

EXAMPLE XII

Eleven runs were made on the demethylation of n-hexadecane (cetane) using the nickel on kieselguhr catalyst pretreated with hydrogen at 1000° F. as described in Example I. The runs were made at temperatures ranging from 490° to 600° F. using a constant hourly liquid space velocity of 1.5, pressures from atmospheric to 200 pounds, and hydrogen : hydrocarbon ratios from 4:1 to approximately 8:1. The products from all the runs were blended and subjected to vacuum distillation. The conversion to lower boiling hydrocarbons was found to be 44.4%. The following is the composition of the demethylation products other than methane.

| Compound | Mole Per Cent |
|---|---|
| n-$C_{15}H_{32}$ | 29.8 |
| n-$C_{14}H_{30}$ | 20.4 |
| n-$C_{13}H_{28}$ | 13.5 |
| n-$C_{12}H_{26}$ | 9.8 |
| n-$C_{11}H_{24}$ | 6.2 |
| n-$C_{10}H_{22}$ | 5.8 |
| n-$C_9H_{20}$ | 4.9 |
| n-$C_8H_{18}$ | 4.7 |
| n-$C_7H_{16}$ | 2.7 |
| n-$C_6H_{14}$ | 2.2 |
| | 100.0 |

The character of the present invention and type of results obtained are evident from the preceding specification and examples, although they are not to be construed as imposing undue limitations upon its broad scope.

We claim as our invention:

1. A hydrocarbon conversion process which comprises, reacting hydrogen with a hydrocarbon selected from the group consisting of a paraffin with more than 4 carbon atoms per molecule, an alkyl aromatic having an alkyl group containing at least 2 carbon atoms, and a saturated alkyl hydroaromatic having an alkyl group containing at least 2 carbon atoms in the presence of a hydrogenating catalyst at a temperature in the approximate range of 350–750° F., a total pressure in the range of from atmospheric to about 3000 pounds per square inch, a molar ratio of hydrogen to hydrocarbon of from about 1.7 to about 11.2, and a liquid hourly space velocity of from about 0.5 to about 8.0, said temperature and total pressure and the hydrogen partial pressure being chosen on the basis of a directly proportional relationship between the temperature and the logarithm of the pressures over said ranges so that a higher temperature within said temperature range is employed with a higher total pressure and a higher partial pressure to effect the splitting from said hydrocarbon, in the form of methane, of only a methyl group or groups.

2. A hydrocarbon conversion process which comprises reacting hydrogen with a hydrocarbon selected from the group consisting of a paraffin with more than 4 carbon atoms per molecule, an alkyl aromatic having an alkyl group containing at least 2 carbon atoms, and a saturated alkyl hydroaromatic having an alkyl group containing at least 2 carbon atoms in the presence of a hydrogenating catalyst at a temperature in the approximate range of 350–750° F., a total pressure in the range of from about 75 to about 3000 pounds per square inch, a molar ratio of hydrogen to hydrocarbon of from about 1.7 to about 11.2, and a liquid hourly space velocity of from about 0.5 to about 8.0, said temperature and total pressure and the hydrogen partial pressure being chosen on the basis of a directly proportional relationship between the temperature and the logarithm of the pressures over said ranges so that a higher temperature within said temperature range is employed with a higher total pressure and a higher partial pressure to effect the splitting from said hydrocarbon, in the form of methane, of only a methyl group or groups.

3. The process as defined in claim 1 further characterized in that said catalyst comprises nickel.

4. The process as defined in claim 1 further characterized in that said catalyst comprises cobalt.

5. The process as defined in claim 2 further characterized in that said catalyst comprises nickel.

6. The process as defined in claim 2 further characterized in that said catalyst comprises cobalt.

7. The process as defined in claim 1 further characterized in that said temperature is in the approximate range of 450–650° F.

8. The process as defined in claim 2 further characterized in that said temperature is in the approximate range of 450–650° F.

9. The process as defined in claim 1 further characterized in that said hydrocarbon is a paraffin containing more than four carbon atoms to the molecule.

10. The process as defined in claim 1 further characterized in that said hydrocarbon is a paraffin containing more than seven carbon atoms to the molecule.

11. The process as defined in claim 1 further characterized in that said hydrocarbon is a trimethylpentane.

12. The process as defined in claim 1 further characterized in that said hydrocarbon is 2,2,3-trimethylpentane.

13. The process as defined in claim 1 further characterized in that said hydrocarbon is an alkyl aromatic hydrocarbon having an alkyl group containing at least two carbon atoms.

14. The process as defined in claim 1 further characterized in that said hydrocarbon is a saturated alkyl hydroaromatic hydrocarbon containing at least two carbon atoms.

VLADIMIR HAENSEL.
VLADIMIR N. IPATIEFF.

REFERENCES CITED

The following references are of record in the file of this patent:

UNITED STATES PATENTS

| Number | Name | Date |
|---|---|---|
| 2,303,118 | Frey | Nov. 24, 1942 |
| 2,394,743 | Bergsteinsson | Feb. 12, 1946 |

(Other references on following page)

FOREIGN PATENTS

| Number | Country | Date |
|--------|---------|------|
| 215,374 | Great Britain | Aug. 14, 1924 |

OTHER REFERENCES

Waterman et al., (A) Jour. Inst. of Pet., vol. 25, 32–40 (1939). Div. 31.

Schoorel et al., Jour. Inst. of Pet., vol. 18, 179–182 (1932). Div. 31.

Waterman et al., (B) Trans. of Faraday Soc., vol. XXXV, 985–992 (1939). Div. 59.

Kasansky et al., Berichte, 69, 1862–1869 (1936).

Sabatier et al., Annales Chim. (8), vol. 4, 1254–5.

Otuka et al., Jour. Soc. Chem. Ind., Japan, vol. 43, 454 B–456 B (1940). Photostat in 196–53.